United States Patent
Boss et al.

(10) Patent No.: US 11,091,122 B2
(45) Date of Patent: Aug. 17, 2021

(54) COGNITIVE BASED AUTOMATED DEICING FOR VEHICLES

(71) Applicant: INTERNATIONAL BUSINESS MACHINES CORPORATION, Armonk, NY (US)

(72) Inventors: Gregory J. Boss, Saginaw, MI (US); Theresa Phelan, Dublin (IE); John D. Wilson, League City, TX (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 16/197,987

(22) Filed: Nov. 21, 2018

(65) Prior Publication Data

US 2020/0156593 A1    May 21, 2020

(51) Int. Cl.
| | |
|---|---|
| *B60S 1/02* | (2006.01) |
| *G05B 13/02* | (2006.01) |
| *B60H 1/04* | (2006.01) |
| *B60S 1/08* | (2006.01) |
| *B60K 11/02* | (2006.01) |

(52) U.S. Cl.
CPC ............... *B60S 1/023* (2013.01); *B60H 1/04* (2013.01); *B60K 11/02* (2013.01); *B60S 1/0822* (2013.01); *G05B 13/026* (2013.01); *G05B 13/0265* (2013.01)

(58) Field of Classification Search
CPC ........ B60S 1/0818; B60S 1/0866; H05B 3/84; H05B 1/0236; H05B 2203/01; B60H 1/00785; B60L 2260/56; B60L 2260/58
See application file for complete search history.

(56) References Cited

U.S. PATENT DOCUMENTS

| | | | |
|---|---|---|---|
| 4,191,348 A | 3/1980 | Holwerda | |
| 5,277,038 A * | 1/1994 | Carr | ............... B60H 1/00492 165/10 |
| 5,496,989 A | 3/1996 | Bradford | |

(Continued)

FOREIGN PATENT DOCUMENTS

DE    102012207925 A1 * 11/2013    ......... B60H 1/00785

*Primary Examiner* — Kenneth J Malkowski
(74) *Attorney, Agent, or Firm* — Brian Restauro; Andrew D. Wright; Roberts Calderon Safran & Cole, P.C.

(57) ABSTRACT

A method includes: predicting, by a computer device, a time a user will start driving a vehicle; determining, by the computer device, freezing conditions; determining, by the computer device, a time to start a deicing system of the vehicle based on the predicted time and the determined freezing conditions; and generating, by the computer device, an output to start the deicing system at the determined time. A system includes: a windshield wiper that is selectively driven by a windshield wiper motor; a wiper sensor configured to detect an amount of deflection of the windshield wiper from a baseline position; and a computer operatively connected to the windshield wiper motor and the wiper sensor, the computer being configured to: actuate the windshield wiper motor; receive data from the wiper sensor while the windshield wiper motor is actuated; and determine a thickness of ice on a windshield based on the received data.

17 Claims, 5 Drawing Sheets

(56) References Cited

U.S. PATENT DOCUMENTS

| | | | |
|---|---|---|---|
| 6,144,906 A * | 11/2000 | Buchanan, Jr. | B60S 1/0807 |
| | | | 307/9.1 |
| 7,735,744 B2 | 6/2010 | Eisenhour | |
| 8,921,739 B2 | 12/2014 | Petrenko | |
| 9,409,549 B2 | 8/2016 | Yopp | |
| 9,724,980 B2 | 8/2017 | Hoke | |
| 2012/0234816 A1* | 9/2012 | Petrenko | H05B 1/0236 |
| | | | 219/203 |
| 2014/0165320 A1 | 6/2014 | Wilson | |
| 2016/0198525 A1* | 7/2016 | Dudar | H05B 1/0236 |
| | | | 219/203 |
| 2016/0244010 A1* | 8/2016 | Tseng | B60H 1/00778 |
| 2016/0342906 A1* | 11/2016 | Shaashua | G06N 20/00 |
| 2016/0347288 A1 | 12/2016 | Almalki | |
| 2018/0005084 A1* | 1/2018 | Crawford | G07C 5/0816 |
| 2018/0060742 A1* | 3/2018 | Penilla | G06F 3/04817 |
| 2020/0116857 A1* | 4/2020 | Flores Tapia | G01S 13/951 |

* cited by examiner

COGNITIVE BASED AUTOMATED DEICING FOR VEHICLES

BACKGROUND

The present invention relates generally to vehicles and, more particularly, to a cognitive based system for automatically deicing windows of vehicles.

Ice commonly accumulates on motor vehicle windshields during winter months. The most common way to remove ice from a windshield is to manually scrape the ice off the windshield. Other ways of deicing a windshield include manually starting the vehicle and manually turning on the defroster, spraying deicing fluids on the windshield, or leaving the defrost system in an on position and remotely starting the vehicle with a smartphone or key fob.

SUMMARY

In a first aspect of the invention, there is a computer-implemented method including: predicting, by a computer device, a time a user will start driving a vehicle; determining, by the computer device, freezing conditions; determining, by the computer device, a time to start a deicing system of the vehicle based on the predicted time and the determined freezing conditions; and generating, by the computer device, an output to start the deicing system at the determined time.

In another aspect of the invention, there is a computer program product including a computer readable storage medium having program instructions embodied therewith. The program instructions are executable by a computer device to cause the computer device to: predict a time a user will start driving a vehicle; determine freezing conditions; determine a time to start a deicing system of the vehicle based on the predicted time and the determined freezing conditions; and generate an output to start the deicing system at the determined time.

In another aspect of the invention, there is system including: a windshield wiper that is selectively driven by a windshield wiper motor; a wiper sensor configured to detect an amount of deflection of the windshield wiper from a baseline position; and a computer operatively connected to the windshield wiper motor and the wiper sensor. The computer is configured to: actuate the windshield wiper motor; receive data from the wiper sensor while the windshield wiper motor is actuated; and determine a thickness of ice on a windshield based on the received data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to vehicles and, more particularly, to a cognitive based system for automatically deicing windows of vehicles. The most common conventional methods of deicing vehicle windshields are time consuming and/or environmentally unfriendly. For example, manually scraping ice off a windshield consumes time. So does manually starting the vehicle (e.g., in the vehicle or remotely) and waiting for the defrost system to warm up to melt the ice. Applying deicing fluids might be faster than scraping, but comes at an expense to the environment.

Implementations of the invention address these disadvantages by providing a system that predicts a time a driver will start a vehicle and that automatically starts a deicing system prior to the predicted time of starting the vehicle. Aspects of the invention are directed to a deicing (e.g., defrosting) system that cognitively determines when to begin defrosting a windshield of a vehicle in advance of the user desiring to drive the vehicle, therefore eliminating the loss of time. This is useful in non-autonomous and semi-autonomous vehicles in which the driver needs to see outside the vehicle for safe driving. This is also useful for autonomous vehicles in which riders wish to see out the windows. Implementations of the invention make the process of defrosting automatic and cost effective so that the driver does not endure freezing conditions while attempting conventional methods of deicing. Implementations of the invention are also more environmentally friendly than conventional methods of deicing, as implementations of the invention use excess heat from the engine to defrost the windshield without turning the engine on in most instances.

According to aspects of the invention, a system utilizes cognitive analysis to determine when to turn on a deicing (e.g., defrost) system of a vehicle prior to a user starting the vehicle. In embodiments, the system predicts: (i) a time the user will start driving the vehicle and (ii) a time to turn on the deicing system prior to the predicted time the user will start driving the vehicle. In embodiments, the deicing system stores excess heat from the engine of the vehicle. In embodiments, the deicing system includes a fluid circuit that is selectively activated independently of the vehicle engine, such that the system generates heated defrost air without starting the vehicle engine.

In accordance with aspects of the invention, the prediction of the time the user will start driving the vehicle is based on at least one of: pattern data; pre-driving activity data; and social and/or calendar data. In embodiments, the pattern data comprises data observed from the user's previous driving patterns. For example, the system may detect that the user starts the vehicle before 7:30 AM every weekday morning, and use this data in predicting the time the user will start driving the vehicle. In embodiments, the pre-driving activity data comprises determined correlations between the user's driving behavior and data from IoT (Internet of Things) devices and/or user devices. In embodiments, the social and/or calendar data comprises data obtained from one or more of the user's calendar and the user's social media. In implementations, the system leverages one or more of the pattern data, the pre-driving activity data, and the social and/or calendar data to predict a time the user will start driving the vehicle, and then, when coincident with icing conditions, automatically turns on the deicing system prior to the predicted time of stating driving the vehicle.

In accordance with aspects of the invention, the determination of the time to turn on the deicing system is based on the predicted time the user will start driving the vehicle and at least one of: a determination of ice on the windshield; and predicted weather at the location of the vehicle. In embodiments, the vehicle is equipped with a least one sensor that detects the presence of ice on the windshield. Based on detecting ice on the windshield and predicting the time the user will start driving the vehicle, the system may be configured to predict a time to turn on the deicing system in order to melt the ice on the windshield prior to the predicted time the user will start driving the vehicle. In further embodiments, the system uses predicted weather data to predict that ice will form on the windshield prior to the predicted time the user will start driving the vehicle. Based on predicting that ice will form on the windshield from the weather data, the system may be configured to predict a time to turn on the deicing system in order to melt the ice on the windshield prior to the predicted time the user will start driving the vehicle.

As will be understood from the description herein, in an aspect of the invention there is a computer-implemented method comprising: predicting a time at which to start deicing a vehicle such that the vehicle is deiced and available to a user of the vehicle by the time the user is prepared to drive the vehicle based on weather data and historical use of the vehicle; and deicing a set of zones of the vehicle in an order based on a priority level of each respective zone and a confidence score associated with the predicted time.

As will be understood from the description herein, in an aspect of the invention there is a computer-implemented system and method to determine an optimized start time to deice a vehicle prior to a driver entering the vehicle. In embodiments, the system employs sensors and mechanisms for monitoring driving patterns, detecting a user's pre-driving activity, detecting an amount of ice on the windshield and time required to deice. In embodiments, the system also uses other data sources including social media and calendaring data to predict vehicle usage. In embodiments, the system detects activities that indicate a driver is intending to take a trip. For example, the system may obtain data from an IoT sensor on a closet door that holds the user's vehicle key, and determine that the user will start the vehicle soon based on detecting the closet door was opened. In another example, the system records data defining a set of activities that a user performs prior to taking a business trip. In another example, the system determines intended future locations of a user by analyzing social media posts (e.g. "I can't wait to see the concert tonight") which indicate a time and location. In this example, the system determines when the user would need to leave in order to be able to drive to the intended future location by the indicate time. Additionally, the system determines an amount of ice on the windshield and determines an amount of time required to run the dicing system to melt the ice on the windshield. Based on the determined start time of the vehicle and the determined amount of time to melt the ice, the system determines a time to start running the deicing system prior to the determined start time of the vehicle such that the ice is melted when the driver arrives at the vehicle.

The IoT functionality leveraged by implementations of the invention enables a system that provides silent electrical deicing of vehicle windows, either automatically based on user data as described herein or at the touch of a button. In this manner, implementations of the invention provide the advantage of eliminating the need for manual scraping of ice by the user.

Additional aspects of the invention provide predictively aggressive de-icing as probability thresholds increase. In embodiments, the system controls fans in the vehicle to initially direct defrost air to a first zone, such as the driver side of the windshield. In embodiments, as the system determines higher probability threshold levels that the driver is indeed getting ready to use the vehicle, the system controls fans in the vehicle to direct defrost air to other zones (e.g., in addition to the first zone). This style of incremental actuation creates a prioritization level approach based on probability. In further embodiments, after the system completes deicing the front windshield, the system then controls fans in the vehicle to direct more of the defrost air to other zones (e.g., side windows, rear windshield, etc.). In this manner, different windows of the vehicle are deiced in a staged process.

In embodiments, the system employs a method of machine learning to develop a personalized proactive system for a respective user. In embodiments, the system employs a method to determine the environmental conditions prior to activating the deicing system. For example, in some implementations, the system for delivering defrost air to the windshield is activated when: pattern based data indicates an upcoming usage of the vehicle; the current outside air temperature is below freezing; and weather data indicates precipitation for the location of the vehicle before and/or during the time of the upcoming usage of the vehicle.

Embodiments of the invention improve the technology of deicing systems of motor vehicles by providing users with a system that automatically starts a deicing system based on cognitive analysis of user data. Embodiments of the invention employ an unconventional arrangement of steps including: predicting, by a computer device, a time a user will start driving a vehicle; determining, by the computer device, freezing conditions; determining, by the computer device, a time to start a deicing system of the vehicle based on the predicted time and the determined freezing conditions; and generating, by the computer device, an output to start the deicing system at the determined time. The steps themselves are unconventional, and the combination of the steps is also unconventional.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
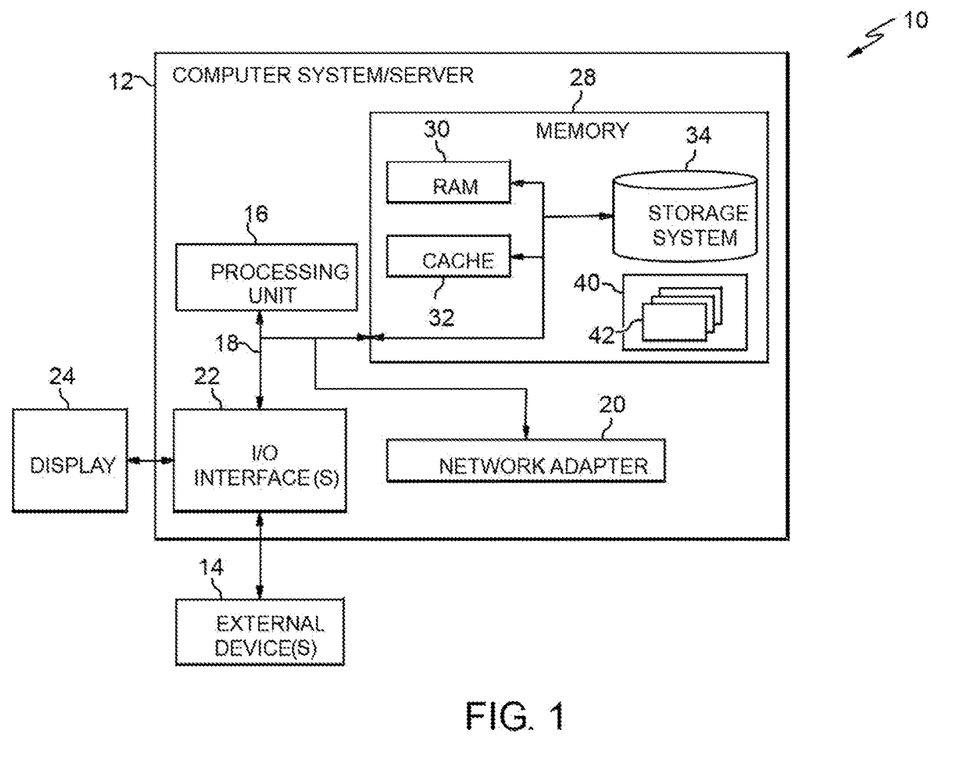
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system.

Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
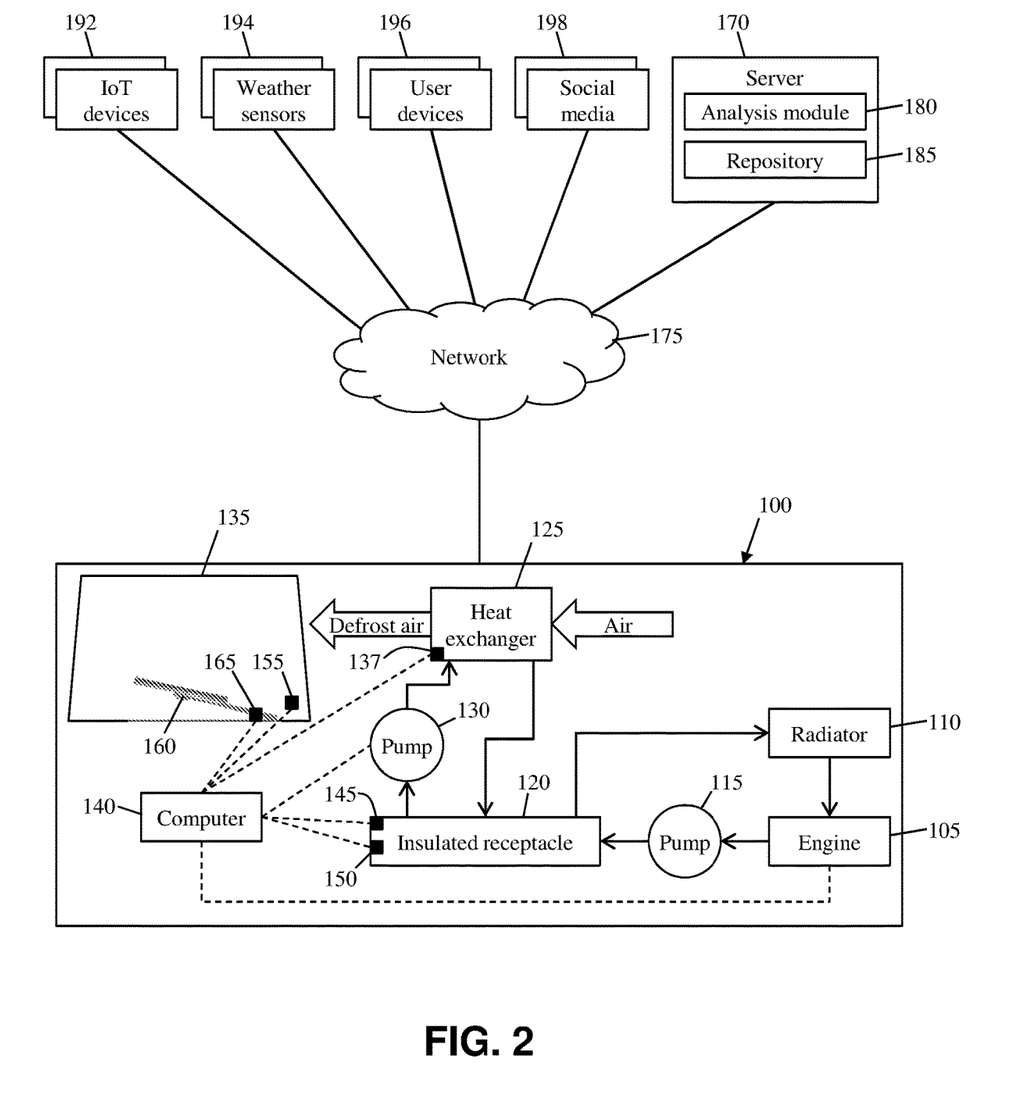
FIG. 2 shows a block diagram of an exemplary environment in accordance with aspects of the invention.

FIG. 2 shows a block diagram of an exemplary environment in accordance with aspects of the invention. The environment includes a vehicle 100 such as a car, truck, van, bus, etc. The vehicle 100 includes an engine 105, a radiator 110, and a water pump 115. The water pump 115 is connected to plumbing that forms a fluidic circuit between the engine 105 and the radiator 110, and pumps coolant through the fluidic circuit to cool the engine 105.

According to aspects of the invention, the vehicle 100 includes an insulated receptacle 120 in the fluidic circuit between the water pump 115 and the radiator 110. The insulated receptacle 120 is configured to receive coolant from the pump 115 and store a volume of coolant at a location in the circuit that is downstream of the engine 105 and upstream of the radiator 110. In this manner, the insulated receptacle 120 is configured to store heated coolant. In embodiments, the insulated receptacle 120 is thermally insulated to an extent sufficient to maintain a temperature of the coolant inside the insulated receptacle 120 above a predefined level for a predefined amount of time. In a non-limiting example, the temperature of the coolant exiting the engine is about 180° F. to about 200° F., and the insulated receptacle 120 is insulated such that the coolant stored in the insulated receptacle 120 stays above 90° F. for eight hours after the engine 105 is turned off. This example is for illustration only, and implementations of the invention may use any desired amount of thermal insulation with the insulated receptacle 120.

In accordance with aspects of the invention, a second fluidic circuit is arranged between the insulated receptacle 120 and a heat exchanger 125. A second pump 130 is arranged in the second fluidic circuit (e.g., between the insulated receptacle 120 and a heat exchanger 125) to pump heated coolant from the insulated receptacle 120 to the heat exchanger 125. The heat exchanger 125 is configured to use the heated coolant to generate defrost air, e.g., by heating cabin air and/or external air, for deicing one or more windows of the vehicle 100, such as a windshield 135. In aspects, the heated coolant passes through one or more heat exchange elements (e.g., tubes, fins, plates, etc.) in the heat exchanger 125, and the air passes over the one or more heat exchange elements, with the result being an exchange of heat from the coolant to the air. The exchange of heat lowers the temperature of the coolant and raises the temperature of the air. The air that is heated in this manner (referred to herein as defrost air) is directed toward one or more windows in the vehicle 100, such as the windshield 135. One or more fans 137 are used to move the air through the heat exchanger 125, and may be arranged either internal or external to the heat exchanger 125. In embodiments, the coolant exits the heat exchanger 125 and is returned to the insulated receptacle 120. According to aspects of the invention, the second pump 130 and the fan 137 can be turned on, either automatically or manually, when the engine 105 is not running. In this manner, the system may generate heated defrost and direct it to the windshield air by running only the second pump 130 and the fan 137 (e.g., without running the engine 105).

Still referring to FIG. 2, the vehicle 100 includes a computer 140 that comprises one or more elements of the computer system 12 of FIG. 1. In embodiments, the computer 140 comprises a processor, a memory, and a wireless communication system. In embodiments, the computer 140 is operatively connected to the engine 105, and is configured to selectively turn the engine 105 on or off when predefined conditions are satisfied. In embodiments, the computer 140 is operatively connected to the second pump 130 and the fan 137, and is configured to selectively turn the second pump 130 and the fan 137 on or off, e.g., to selectively control the generation of defrost air for deicing the windshield 135.

In embodiments, the computer 140 is operatively connected to a temperature sensor 145 in the insulated receptacle 120 and a fill level sensor 150 in the insulated receptacle 120. The temperature sensor 145 detects a temperature of the coolant held in the insulated receptacle 120. The fill level sensor 150 detects a level of the coolant held in the insulated receptacle 120. In embodiments, the computer 140 is configured to determine a volume of coolant in the insulated receptacle 120 based on that data from the fill level sensor 150, and to determine an amount of thermal energy contained in the insulated receptacle 120 based on the determined volume of coolant and the temperature of the coolant (from the temperature sensor 145).

In implementations, the computer 140 is operatively connected to at least one ice sensor 155 that detects whether ice is present on the windshield 135. The ice sensor 155 may be an optical sensor, for example, that detects the presence of ice on the windshield 135 using optical techniques. Other types of ice detecting sensors may also be used.

According to further aspects of the invention, the computer 140 is operatively connected to a motor of a windshield wiper 160 and a wiper sensor 165 associated with the wiper 160. In embodiments, the computer 140 is configured to selectively turn the wiper motor on or off when predefined conditions are satisfied. In embodiments, the wiper sensor 165 is configured to measure an amount of deflection of the wiper 160 from a baseline position. In implementations, the baseline position is the position of the wiper 160 when an edge of the wiper 160 rests directly against the external surface of the windshield 135. When ice is present on the external surface of the windshield 135, moving the wiper 160 via the wiper motor causes the wiper 160 to travel over the ice. The ice on the windshield causes the wiper 160 to be deflected away from its baseline position when the wiper 160 is traveling over the ice. In this manner, by measuring the amount of deflection of the wiper 160 using the wiper sensor 165, the computer 140 is configured to determine a thickness of the ice on the windshield 135. In embodiments, the wiper sensor 165 measures the amount of deflection by measuring an amount of tension in a spring of the wiper 160 and/or measuring an amount of deflection of a flexible or hinged portion of the wiper arm mechanism.

In an embodiment, the computer 140 uses data from the ice sensor 155 to determine that ice is present on the windshield and, based on this determination, controls the wiper motor to move the wiper 160, and uses the resulting data from the wiper sensor 165 to determine a thickness of the ice on the windshield 135. In another embodiment, the ice sensor 155 is omitted, and the computer 140 uses data from the wiper sensor 165 to both detect the ice and determine a thickness of the ice on the windshield 135.

With continued reference to FIG. 2, according to aspects of the invention, the vehicle 100 communicates with a server 170 via a network 175. In embodiments, the network 175 comprises a communication network such as a LAN, WAN, or the Internet, or a combination of such communication network. The server 170 is a computer device and comprises one or more elements of the computer system 12 of FIG. 1. In embodiments, the server 170 comprises an analysis module 180 that is configured to perform certain functions described herein including: predicting a time the user will start driving the vehicle 100; and determining a time to turn on the second pump 130 and the fan 137 (e.g., the deicing system) prior to the predicted time the user will start driving the vehicle 100. The analysis module 180 may comprise one or more program modules 42 as described with respect to FIG. 1. In embodiments, the server 170 also includes or communicates with a repository 185 that stores data used by the analysis module 180. The repository 185 may be a storage system 34 as described with respect to FIG. 1.

In accordance with aspects of the invention, the analysis module 180 is configured to predict a time the user will start driving the vehicle 100 based on at least one of: pattern data; pre-driving activity data; and social and/or calendar data. In embodiments, the pattern data comprises data observed from the user's historic driving patterns with the vehicle 100, with such data being obtained from the computer 140 and stored in the repository 185. In one example, the analysis module 180 is configured to analyze historic driving data of the user and the vehicle 100 to determine patterns of when the user starts the vehicle 100 on certain days (e.g., the user starts the vehicle 100 before 7:30 AM every weekday morning).

In embodiments, the pre-driving activity data comprises data from IoT devices 192 and/or user devices 196. In embodiments, the analysis module 180 analyzes historic driving activities of the vehicle (e.g., start times of the engine 105 as reported by the computer 140) and data from IoT devices 192 and/or user devices 196, and based on this the analysis module 180 determines correlations between data from one or more of the IoT devices 192 and/or user devices 196 and the historic start times of the engine 105. For example, the user may have a smart coffee machine equipped with an IoT device 192 that reports when the coffee machine is turned on, and the analysis module 180 may determine by analyzing historic data from the computer 140 and the smart coffee machine that there is a 70% confidence that the user will start the vehicle 30 minutes after starting the smart coffee machine on a weekday. In another example, the user may have a maps application on their smartphone (e.g., one of the user devices 196), and the analysis module 180 may determine by analyzing historic data from the computer 140 and the smartphone that there is a 80% confidence that the user will start the vehicle 10 minutes after checking traffic on the maps application on the smartphone. In another example, the user may keep their vehicle key in a cabinet having a door equipped with an IoT device 192 that detects opening and closing of the cabinet door, and the analysis module 180 may determine by analyzing historic data from the computer 140 and the IoT device 192 that there is a 85% confidence that the user will start the vehicle 5 minutes after opening the cabinet door. These examples are not intended to be limiting, and implementations of the invention may determine and utilize any type and any number of correlations between historic start time of the vehicle and data from IoT devices 192 and/or user devices 196.

According to aspects of the invention, after determining correlations as described above, the analysis module 180 uses the determined correlations to predict a future start time of the vehicle 100 based on current data from the external data sources. For example, in the example of the cabinet having a door equipped with an IoT device 192, the analysis module 180 may obtain data that the cabinet door was opened at 7:12 AM, and based on this current data and the determined correlation, the analysis module 180 predicts that the user will start the vehicle 100 at 7:17 AM (e.g., 5 minutes after the opening of the cabinet door). In this manner, the analysis module 180 is configured to predict a time the user will start the vehicle 100 based on data from one or more of the IoT devices 192 and/or the user devices 196.

In embodiments, the analysis module 180 predicts a time the user will start driving the vehicle 100 based on combinations of pattern data and pre-driving activity data. For example, the analysis module 180 may combine the determined daily pattern (e.g., the user starts the vehicle 100 before 7:30 AM every weekday morning) with a determined correlation (e.g., the user checked traffic on the maps application on their smartphone at 7:18 AM) to predict with 97% confidence that the user will start driving the vehicle 100 at 7:28 AM.

Still regarding predicting a time the user will start driving the vehicle 100, in embodiments the analysis module 180 is configured to use social and/or calendar data to predict the start time. In embodiments, the social and/or calendar data comprises data obtained from one or more of: the user's calendar (e.g., from user devices 196) and the user's social media (e.g., from the user's social media 198). For example, a calendar entry in the user's electronic calendar on their smartphone (e.g., user device 196) may indicate an event at a date, time, and location. In this example, the analysis module 180 may predict a time the user will start driving the vehicle 100 by determining how much time it takes to drive from the user's current location to the event location, and subtracting that amount of time from the event time. In another example, the user posts a social media message (e.g., social media 198) saying "I can't wait to see the XYZ concert tonight." In this example, the analysis module 180 predicts a time the user will start driving the vehicle 100 by: determining a time and location of the concert (e.g., based on an Internet search for the name of the band (XYZ) and the location of the concert tonight); determining how much time it takes to drive from the user's current location to the concert location; and subtracting that amount of time from the concert start time.

In embodiments, the analysis module 180 predicts a time the user will start driving the vehicle 100 based on combinations of social and/or calendar data and pre-driving activity data. For example, the analysis module 180 may combine the determined start time from a social media post (e.g., the user needs to leave no later than 5:45 PM to drive to the XYZ concert) with a determined pre-driving activity correlation (e.g., the user opened the cabinet drawer at 5:30 PM) to predict with 96% confidence that the user will start the vehicle 100 at 5:35 PM.

Still referring to FIG. 2, according to aspects of the invention, the analysis module 180 also determines a time to turn on the deicing system (e.g., the second pump 130 and the fan 137) based on the predicted time the user will start driving the vehicle 100 and at least one of: a determination of ice on the windshield 135; and predicted weather at the location of the vehicle 100. In embodiments, the vehicle 100 is equipped with a least one sensor (e.g., the ice sensor 155 and/or the wiper sensor 165) that detects the presence of ice on the windshield 135. In embodiments, based on detecting ice on the windshield 135 and predicting the time the user will start driving the vehicle 100, the analysis module 180 is configured to determine a time to turn on the deicing system in order to melt the ice on the windshield 135 prior to the predicted time the user will start driving the vehicle 100.

In embodiments, the analysis module 180 is configured to determine the time to turn on the deicing system based on a determination of how long it will take to melt the ice on the windshield 135. In aspects, the analysis module 180 determines an amount of ice on the windshield 135, e.g., using the wiper sensor 165 or another sensor that determines a thickness of ice on a windshield. The analysis module 180 also determines the temperature of the coolant in the insulated receptacle 120, e.g., via the temperature sensor 145. The analysis module 180 then determines a predicted temperature of the defrost air based on the temperature of the coolant, the temperature of the air at the inlet of the heat exchanger 125, and the predefined efficiency of the heat exchanger 125. The analysis module 180 then determines how much time it will take to melt the ice on the windshield based on the determined amount of ice on the windshield, the predicted temperature of the defrost air, and other observable properties (e.g., the temperature of the air outside the vehicle 100, the temperature of the air inside the vehicle 100, the mass flow rate of the defrost air provided by the fan 137, etc.). The analysis module 180 then subtracts the determined amount of time to melt the ice from the predicted start time of the vehicle 100 to arrive at the determined start time of the deicing system.

In embodiments, the analysis module 180 is configured to determine the time to turn on the deicing system based on predicted weather at the location of the vehicle 100. In embodiments, the analysis module 180 obtains weather forecast data from one or more weather forecasting services. Using the weather forecast data for the location of the vehicle 100, the module can 180 predicts a time that ice is likely to form on the windshield 135. Additionally or alternatively to weather forecast data provided by a weather service, the analysis module 180 may predict a time that ice is likely to form on the windshield 135 based on data from weather sensors 194. For example, the analysis module 180 may determine a pattern of weather moving toward the vehicle 100 based on data from plural weather sensors 194 in the geographic vicinity of the vehicle 100, and based on this determined pattern of weather, the analysis module 180 may predict a time that ice is likely to form on the windshield 135. In both embodiments, based on predicting a time that ice will form on the windshield from the weather data, the analysis module 180 is configured to determine a time to turn on the deicing system in order to melt the ice on the windshield 135 prior to the predicted time the user will start driving the vehicle 100.

As described herein, one of the advantages of implementations of the invention is that the deicing system can be turned on to melt ice on the windshield without turning on the engine 105. This is due to the fact that the insulated receptacle 120 stores thermal energy and the second pump 130 and fan 137 can be turned on to generate heated defrost air without turning on the engine 105. However, there might be situations where the amount of thermal energy available in the coolant in the insulated receptacle 120 is not enough to melt the ice on the windshield 135.

Accordingly, in embodiments the analysis module 180 is configured to determine whether it is necessary to turn on the engine 105 to increase a temperature of the coolant in the insulated receptacle 120 in order to melt the ice on the windshield 135. In one embodiment, the analysis module 180 monitors the temperature of the coolant in the insulated receptacle 120, e.g., via the temperature sensor 145, and instructs the computer 140 to turn on the engine if the following conditions are simultaneously satisfied: (a) the temperature detected by the temperature sensor 145 is less than a threshold amount and (b) there is still ice on the windshield 135 (e.g., as detected via sensor 155 or sensor 165). Based on these two conditions being satisfied, the analysis module 180 determines that there is not sufficient thermal energy in the insulated receptacle 120 to melt the ice on the windshield 135, and the analysis module 180 thus sends an instruction to the computer 140 to turn on the engine 105, which will cause heated coolant to be delivered to the insulated receptacle 120.

In another embodiment, the analysis module 180 determines an amount of ice on the windshield 135, e.g., based on a predefined area of the windshield 135 and a thickness of the ice detected by sensor 165. In this embodiment, the analysis module 180 also determines an amount of ice that can be melted using the coolant in the insulated receptacle 120 without turning on the engine 105. In one example, the amount of ice that can be melted with the deicing system is predicted using the aforementioned example and additionally taking into account the volume of coolant in the insulated receptacle 120, as detected by the fill level sensor 150. In the event the analysis module 180 determines that the determined amount of ice on the windshield 135 can be melted using the thermal energy in the insulated receptacle 120, then the analysis module 180 does not instruct the computer 140 to turn on the engine 105. On the other hand, in the event the analysis module 180 determines that the determined amount of ice on the windshield 135 cannot be melted using the thermal energy in the insulated receptacle 120, then the analysis module 180 does instruct the computer 140 to turn on the engine 105, e.g., to cause heated coolant to be delivered to the insulated receptacle 120.

According to aspects of the invention, the system employs machine learning to improve the accuracy of determinations and predictions described herein. In particular, the analysis module 180 may be configured to employ machine learning to improve the accuracy each of (i) the predicted time the user will start driving the vehicle and (ii) the determined time to turn on the deicing system prior to the predicted time the user will start driving the vehicle. In one example, the analysis module 180 is configured to monitor when the user actually starts driving the vehicle, and compare the time the user starts driving the vehicle to the predicted time the user will start driving the vehicle. Based on this comparison, the analysis module 180 may modify the algorithm(s) that are used to predict the time the user will start driving the vehicle. In another example, the analysis module 180 is configured to detect whether ice is present on the windshield when the user actually starts driving the vehicle. Based on this detection, the analysis module 180 may modify the algorithm(s) that are used to predict when to turn on the deicing system prior to the time the user will start driving the vehicle.

Implementations of the invention progressively and dynamically determine a confidence of the predicted time the user will start driving the vehicle as new data becomes available. For example, the analysis module 180 may initially predict the time the user will start driving the vehicle based on pattern data. Subsequent to the initial determination, the analysis module 180 may obtain pre-driving activity data that can be combined with the pattern data to re-predict the time the user will start driving. In embodiments, the analysis module 180 determines a confidence score with each of the predicted times, e.g., a first confidence of the predicted time based on the pattern data, and a second confidence of the predicted time based on the pattern data and the pre-driving activity data.

In embodiments, based on the progressively and dynamically determined confidence of the predicted time the user will start the vehicle, the analysis module 180 actuates different zones of the deicing system at different times. For example, based on determining the predicted start time with a first confidence (e.g., 50% confidence) the analysis module 180 may actuate a first zone of the deicing system (e.g., the driver side of the windshield). In this same example, based on subsequently re-determining the predicted start time with a second confidence (e.g., 70% confidence) the analysis module 180 may actuate the first zone and a second zone of the deicing system (e.g., the driver side of the windshield and the passenger side of the windshield). In this same example, based on subsequently re-determining the predicted start time with a third confidence (e.g., 90% confidence) the analysis module 180 may actuate the first zone, the second zone and a third zone of the deicing system (e.g., the driver side of the windshield, the passenger side of the windshield, and the side windows).

Figure 3:
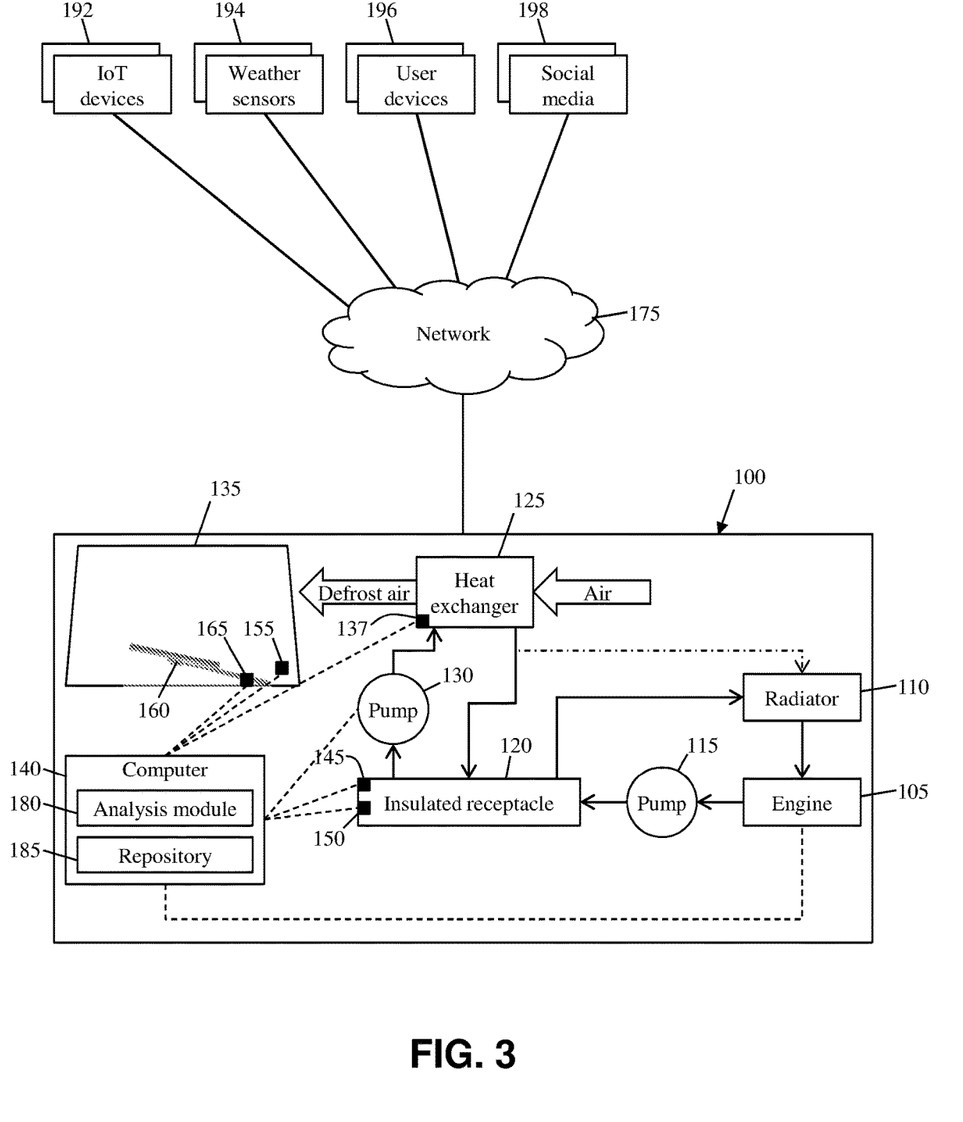
FIG. 3 shows a block diagram of an exemplary environment in accordance with aspects of the invention.

FIG. 3 shows a block diagram of another exemplary environment in accordance with aspects of the invention. In the environment of FIG. 3, the analysis module 180 and repository 185 are onboard the vehicle 100, e.g., as part of the computer 140. In this manner, all the described functions of the analysis module 180 are performed locally at the vehicle computer 140 instead of remotely at a server.

Figure 4:
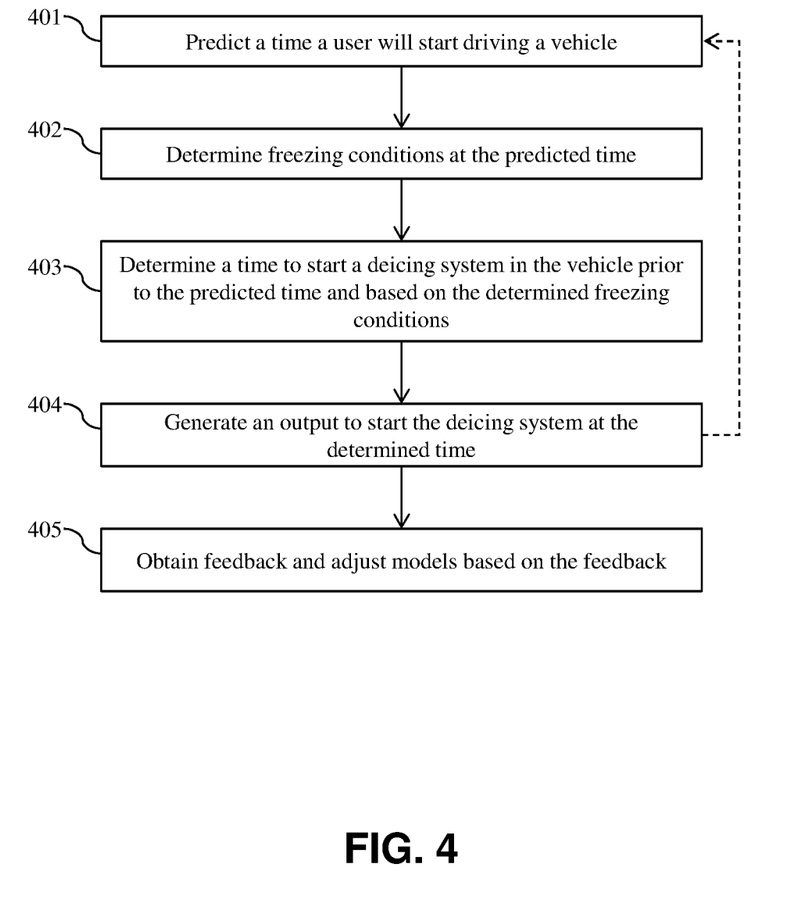
FIG. 4 shows a flowchart of an exemplary method in accordance with aspects of the invention.

FIG. 4 shows a flowchart of an exemplary method in accordance with aspects of the present invention. Steps of the method may be carried out in the environment of FIGS. 2 and/or 3 and are described with reference to elements depicted in FIGS. 2 and 3.

At step 405, the system predicts a time a user will start driving a vehicle. In embodiments, and as described with respect to FIG. 2, the analysis module 180 predicts a time a user will start driving the vehicle being based on at least one of: pattern data; pre-driving activity data; and social and/or calendar data. In embodiments, the pattern data is determined by analyzing historical data of the user driving the vehicle (e.g., determining patterns based on times the user normally starts driving the vehicle during certain days, etc.). In embodiments, the pre-driving activity data is obtained from IoT devices 192 and/or user devices 196. In embodiments, the analysis module 180 determines correlations between historic driving data and historic data from the IoT devices 192 and/or user devices 196, obtains current data from the IoT devices 192 and/or user devices 196, and predicts a start time of the vehicle based on the current data and the correlations. In embodiments, the social and/or calendar data is obtained from the user devices 196 and/or the user's social media 198.

At step 402, the system determines freezing conditions at the vehicle at the predicted time (from step 401). In embodiments, and as described with respect to FIG. 2, the analysis module 180 determines freezing conditions at the vehicle 100 based on at least one of: detecting ice on the windshield 135 (e.g., using sensors such as sensor 155 or sensor 165); and predicting ice on the windshield 135 based on weather data (e.g., weather forecast data and/or data from weather sensors 194 that is extrapolated to predict future weather at the vehicle).

At step 403, the system determines a time to start a deicing system in the vehicle prior to the predicted time (from step 401) and based on the determined freezing conditions (from step 402). In embodiments, and as described with respect to FIG. 2, the analysis module 180 determines the time to start the deicing system based on determining an amount of time it will take to melt the ice from the windshield 135, and subtracting this determined amount of time from the predicted time the user will start driving the vehicle. As described with respect to FIG. 2, the analysis module 180 may be programmed with various algorithms to determine the amount of time it will take to melt the ice based on various parameters of the system.

At step 404, the system generates an output to start the deicing system of the vehicle at the determined time (from step 403). In the embodiment depicted in FIG. 2, where the analysis module 180 is at a server 170 remote from the vehicle 100, the generating the output comprises the server 170 transmitting instruction to the vehicle, wherein the instruction causes the vehicle computer 140 to activate the second pump 130 and the fan 137 at the determined time (from step 403). In the embodiment depicted in FIG. 3, where the analysis module 180 is executed by the computer 140 in the vehicle 100, the generating the output comprises the computer 140 generating one or more control signals to activate the second pump 130 and the fan 137 at the determined time (from step 403).

As indicated by the dashed line from step 404 to step 401, in embodiments the analysis module 180 progressively and dynamically determines a confidence of the predicted time the user will start driving the vehicle as new data becomes available. In implementations, the generating the output at step 404 comprises generating an output to start (e.g., actuate) different zones of the deicing system at different times based on the progressively and dynamically determined confidence of the predicted start time.

At step 405, the system obtains feedback and adjusts one or more algorithms based on the feedback. In embodiments, and as described with respect to FIG. 2, the analysis module 180 obtains data that indicates when the user starts the vehicle 100, compares this data to the predicted start time (from step 401), and uses machine learning and this comparison to adjust one or more of the algorithms (e.g., models) that the analysis module 180 uses to predict the start time (e.g., at step 401). In embodiments, and as described with respect to FIG. 2, the analysis module 180 obtains data that indicates whether ice is still present on the windshield 135 when the user starts the vehicle 100, compares this data to the determined time to start the deicing system (from step 403), and uses machine learning and this comparison to adjust one or more of the algorithms (e.g., models) that the analysis module 180 uses to determine the time to start the deicing system (e.g., at step 403).

In embodiments, when the analysis module 180 uses data from any of the IoT devices 192, weather sensors 194, user devices 196, and social media 198 in making a determination or prediction as described herein, the analysis module 180 stores that data in the repository 185. In aspects, the analysis module 180 also stores feedback data (e.g., data defining when the user started the vehicle, and if ice was present on the windshield when the user started the vehicle) in the repository. In this manner, the analysis module 180 may analyze the data stored in the repository using machine learning techniques to adjust (e.g., tune) the algorithms that the analysis module 180 uses to make determinations and predictions as described herein.

Figure 5:
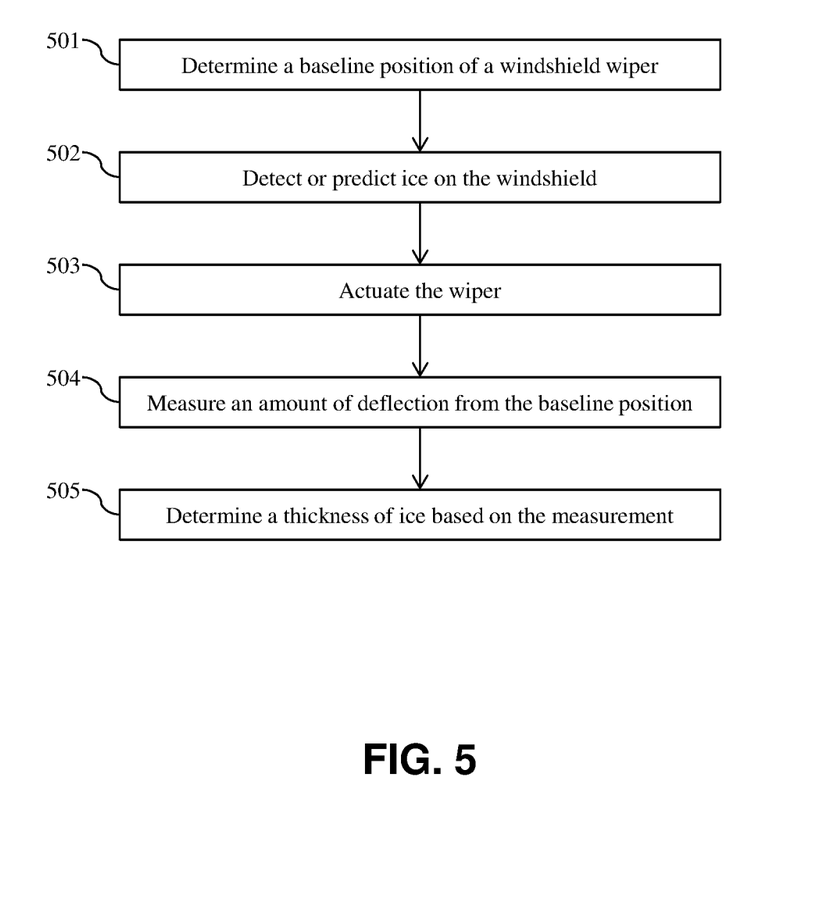
FIG. 5 shows a flowchart of an exemplary method in accordance with aspects of the invention.

FIG. 5 shows a flowchart of an exemplary method in accordance with aspects of the present invention. More specifically, FIG. 5 shows a flowchart of an exemplary method for determining an amount of ice on the windshield, which determined amount may be used at step 403 of FIG. 4 for determining a time to start the deicing system. Steps of the method of FIG. 5 may be carried out in the environment of FIGS. 2 and/or 3 and are described with reference to elements depicted in FIGS. 2 and 3.

At step 501, the system determines a baseline position of a windshield wiper 160 on the windshield 135. In embodiments, and as described with respect to FIG. 2, the baseline position of the wiper 160 is the position when the wiper 160 rests directly against the exterior surface of the windshield 135 with no ice between the wiper 160 and the exterior surface of the windshield 135. In embodiments, step 501 comprises the computer 140 receiving an output signal of the sensor 165 when the wiper 160 is at the baseline position.

At step 502, the system detects or predicts ice on the windshield 135. In embodiments, and as described with respect to FIG. 2, step 502 comprises the computer 140 detecting ice on the windshield 135 by receiving data from sensor 155. In other embodiments, step 502 comprises the analysis module 180 predicting ice on the windshield 135 based on weather data, e.g., weather forecast data and/or data from weather sensors 194.

At step 503, the system actuates the wiper 160. In embodiments, and as described with respect to FIG. 2, the computer 140 sends a control signal to the wiper motor to causes the wiper 160 to move across the windshield in its normal manner. In aspects, step 503 comprises the computer actuating the wiper for a predefined number of cycles, e.g., 1, 2, 3, etc.

At step 504, the system measures an amount of deflection of the wiper 160 from the baseline position while the wiper is actuated. In embodiments, and as described with respect to FIG. 2, the sensor 165 detects a deflection of the wiper 160 from the baseline position as the wiper moves across the windshield (e.g., as caused by the actuation at step 503). In one example, the deflection is determined based on detected differences in tension of a spring of the wiper 160. In another example, the deflection is determined based on a detected amount of physical deflection of an element of the windshield wiper. In aspects, the computer 140 receives this data from the sensor 165.

At step 505, the system determines a thickness of the ice on the windshield 135 based on the measurement from step 505. In embodiments, and as described with respect to FIG. 2, the computer 140 uses a predefined calibration to equate the amount of deflection (measured at step 504) to a thickness of ice on the windshield 135. In embodiments, the computer 140 provides the determined thickness to the analysis module 180 for use in determining a time to start the deicing system.

Aspects of the invention have been described thus far in automated actuation of the deicing system. According to additional aspects of the invention, the computer 140 is configured to start the deicing system (e.g., the second pump 130 and the fan 137) in response to manual input from a user. In one example, one of the user devices 196 (e.g., a smartphone) includes an application that provides a user interface receives touchscreen input from the user, and, based on this input, the application causes the user device 196 to send a signal to the computer 140 to turn on the deicing system. In another example, the user input may be received by an IoT device 192, such as a button of a key fob of the vehicle 100, and based on this input the IoT device 192 may transmit a signal to the computer 140 to turn on the deicing system. In another example, the user input may be voice input provided to a user device 196 such as a smartphone or an intelligent assistant device, and based on this input the user device 196 may transmit a signal to the computer 140 to turn on the deicing system.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
predicting, by a computer device, a time a user will start driving a vehicle;
determining, by the computer device, freezing conditions;
determining, by the computer device, a time to start a deicing system of the vehicle based on the predicted time and the determined freezing conditions; and
generating, by the computer device, an output to start the deicing system at the determined time,
wherein the predicted start time is based on pattern data;
the computer device determines a first confidence of the predicted start time based on the pattern data;
the computer device obtains pre-driving activity data after the determining the first confidence;
the computer device determines a second confidence of the predicted start time based on the pattern data and the pre-driving activity data; and
the generating the output to start the deicing system comprises:
generating a first output to deice a first zone of the vehicle based on the determining the first confidence; and
generating a second output to deice a second zone of the vehicle based on the determining the second confidence.

2. The method of claim 1, wherein the predicting the time is based on at least one selected from the group consisting of: the pattern data; the pre-driving activity data; calendar data; and social media data of the user.

3. The method of claim 1, wherein:
the pattern data comprises data observed from the user's historic driving patterns with the vehicle;
the pre-driving activity data comprises data obtained from an Internet of Things device and/or a user device; and
the pre-driving activity data differs from calendar and/or social media data from an electronic calendar of the user and/or data from a social media account of the user.

4. The method of claim 1, wherein the determining the freezing conditions comprises at least one selected from a group consisting of: detecting ice on a windshield of the vehicle using a sensor; and predicting the freezing conditions based on weather data.

5. The method of claim 4, wherein the weather data comprises at least one selected from a group consisting of: forecast weather data obtained from a service; forecast weather data extrapolated from sensors.

6. The method of claim 1, wherein the determining the time to start the deicing system comprises determining an amount of time to melt ice on a windshield of the vehicle.

7. The method of claim 6, wherein the determining the amount of time to melt the ice on a windshield of the vehicle comprises determining an amount of ice on the windshield.

8. The method of claim 1, wherein:
the computer device comprises a server that is remote from the vehicle; and
the generating the output comprises the server transmitting an instruction to the vehicle to start the deicing system.

9. The method of claim 1, wherein:
the computer device is in the vehicle; and
the generating the output comprises the computer device generating one or more control signals that activate the deicing system.

10. The method of claim 1, wherein the deicing system comprises:
an insulated receptacle in a first fluidic circuit between an engine of the vehicle and a radiator of the vehicle;
a pump and a heat exchanger in a second fluidic circuit in communication with the insulated receptacle, wherein the pump and the heat exchanger are selectively actuated without the engine running.

11. The method of claim 1, wherein the computer device uses at least one algorithm to predict the time the user will start driving the vehicle, and further comprising obtaining feedback and using machine learning to adjust the at least one algorithm based on the feedback.

12. The method of claim 1, wherein the computer device uses at least one algorithm to determine the time to start the deicing system, and further comprising obtaining feedback and using machine learning to adjust the at least one algorithm based on the feedback.

13. A computer program product, the computer program product comprising a computer readable storage medium having program instructions embodied therewith, the program instructions executable by a computer device to cause the computer device to:
predict a time a user will start driving a vehicle;
determine freezing conditions;
determine a time to start a deicing system of the vehicle based on the predicted time and the determined freezing conditions; and generate an output to start the deicing system at the determined time,
wherein the predicted start time is based on pattern data;
the computer device determines a first confidence of the predicted start time based on the pattern data;
the computer device obtains pre-driving activity data after the determining the first confidence;
the computer device determines a second confidence of the predicted start time based on the pattern data and the pre-driving activity data; and
the generating the output to start the deicing system comprises:
  generating a first output to deice a first zone of the vehicle based on the determining the first confidence; and
  generating a second output to deice a second zone of the vehicle based on the determining the second confidence.

14. The computer program product of claim 13, wherein:
the pattern data comprises data observed from the user's historic driving patterns with the vehicle;
the pre-driving activity data comprises data obtained from an Internet of Things device and/or a user device; and
the pre-driving activity data differs from calendar data.

15. A method, comprising:
predicting, by a computer device, a time a user will start driving a vehicle;
determining, by the computer device, freezing conditions;
determining, by the computer device, a time to start a deicing system of the vehicle based on the predicted time and the determined freezing conditions; and
generating, by the computer device, an output to start the deicing system at the determined time,
wherein the predicting the time comprises:
  determining correlations between pre-driving activity data obtained from an Internet of Things device and/or a user device; and
  using the determined correlations to predict a future start time of the vehicle; and
the generating the output to start the deicing system comprises:
  generating a first output to deice a first zone of the vehicle based on the determining a first confidence of the predicted future start time of the vehicle; and
  generating a second output to deice a second zone of the vehicle based on the determining a second confidence of the predicted future start time of the vehicle.

16. The method of claim 15, wherein the pre-driving activity data comprises data from a maps application of the user device.

17. The method of claim 15, wherein the pre-driving activity data differs from pattern data and calendar data.

* * * * *